United States Patent
Gara et al.

(10) Patent No.: US 9,864,423 B2
(45) Date of Patent: Jan. 9, 2018

(54) MITIGATING COMPONENT PERFORMANCE VARIATION

(71) Applicant: Intel Corporation, Santa Clara, CA (US)

(72) Inventors: Alan G. Gara, Palo Alto, CA (US); Steve S. Sylvester, Hillsboro, OR (US); Jonathan M. Eastep, Portland, OR (US); Ramkumar Nagappan, Chandler, AZ (US); Christopher M. Cantalupo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 86 days.

(21) Appl. No.: 14/998,082

(22) Filed: Dec. 24, 2015

(65) Prior Publication Data

US 2017/0185129 A1 Jun. 29, 2017

(51) Int. Cl.
  *G06F 1/32* (2006.01)
  *G06F 1/26* (2006.01)
  *G06F 1/00* (2006.01)
  *G06F 1/20* (2006.01)
  *G06F 9/50* (2006.01)

(52) U.S. Cl.
  CPC ............ *G06F 1/3203* (2013.01); *G06F 1/206* (2013.01); *G06F 1/329* (2013.01); *G06F 1/3296* (2013.01); *G06F 9/5094* (2013.01); *G06F 1/26* (2013.01); *Y02B 60/144* (2013.01)

(58) Field of Classification Search
  CPC ..................................... G06F 1/32; G06F 1/26
  See application file for complete search history.

(56) References Cited

U.S. PATENT DOCUMENTS

| | | | |
|---|---|---|---|
| 2006/0167657 A1* | 7/2006 | Naffziger | G06F 1/3203 702/182 |
| 2007/0061021 A1 | 3/2007 | Cohen et al. | |
| 2008/0104428 A1 | 5/2008 | Naffziger et al. | |
| 2011/0289327 A1* | 11/2011 | Nolterieke | G06F 1/26 713/300 |
| 2012/0324248 A1* | 12/2012 | Schluessler | G06F 1/3253 713/300 |
| 2013/0173946 A1* | 7/2013 | Rotem | G06F 1/3206 713/340 |
| 2013/0226481 A1* | 8/2013 | Berke | G06F 15/177 702/60 |
| 2013/0283068 A1 | 10/2013 | Li et al. | |
| 2013/0332753 A1* | 12/2013 | Varma | G06F 1/26 713/300 |

(Continued)

OTHER PUBLICATIONS

International Search Report and Written Opinion for International Patent Application No. PCT/US2016/063554, dated Aug. 23, 2017, 11 pages.

*Primary Examiner* — Phil Nguyen
(74) *Attorney, Agent, or Firm* — Jordan IP Law, LLC

(57) ABSTRACT

Apparatus and methods may provide for characterizing a plurality of similar components of a distributed computing system based on a maximum safe operation level associated with each component and storing characterization data in a database and allocating non-uniform power to each similar component based at least in part on the characterization data in the database to substantially equalize performance of the components.

17 Claims, 3 Drawing Sheets

(56) References Cited

U.S. PATENT DOCUMENTS

| | | | |
|---|---|---|---|
| 2014/0149753 A1* | 5/2014 | Park | G06F 1/206 |
| | | | 713/300 |
| 2014/0215243 A1* | 7/2014 | Sado | G06F 1/324 |
| | | | 713/322 |
| 2014/0281610 A1 | 9/2014 | Biswas et al. | |
| 2015/0212856 A1 | 7/2015 | Shanmuganathan et al. | |
| 2015/0338896 A1* | 11/2015 | Khatri | G06F 1/324 |
| | | | 713/320 |
| 2016/0187944 A1 | 6/2016 | Eastep et al. | |

* cited by examiner

MITIGATING COMPONENT PERFORMANCE VARIATION

GOVERNMENT INTEREST STATEMENT

This invention was made with Government support under contract number B609815 awarded by the Department of Energy. The Government has certain rights in this invention.

TECHNICAL FIELD

Embodiments generally relate to mitigating component performance variation. More particularly, embodiments relate to mitigating performance variation of components such as processors in distributed computing systems.

BACKGROUND

The scale and performance of large distributed computing systems may be limited by power and thermal constraints. For example, there may be constraints at the site level as well as at the component level. At the component level, components may tend to throttle their performance to reduce temperature and power and avoid damage when workloads cause them to exceed safe thermal and power density operational limits. At the site level, future systems may run under a power boundary to ensure that the site stays within site power limits, wherein the site power limits are derived from constraints on operational costs or limitations of the cooling and power delivery infrastructure.

Concomitantly, manufacturing process variation may result in higher variance in the voltage that is supplied to a component for its circuits to function correctly at a given performance level. Unfortunately, the thermal and power limitations in large distributed computing systems may expose these differences in supply voltage requirements, leading to unexpected performance differences across like components. For example, different processors in the system may throttle to different frequencies because they exhaust thermal and power density headroom at different points. This difference may occur even if the processors are selected from the same bin and/or product SKU because parts from the same bin may still exhibit non-negligible variation in voltage requirements. As another example, a uniform partition of power among like components may result in different performance across components when limiting system power to stay within site limits.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
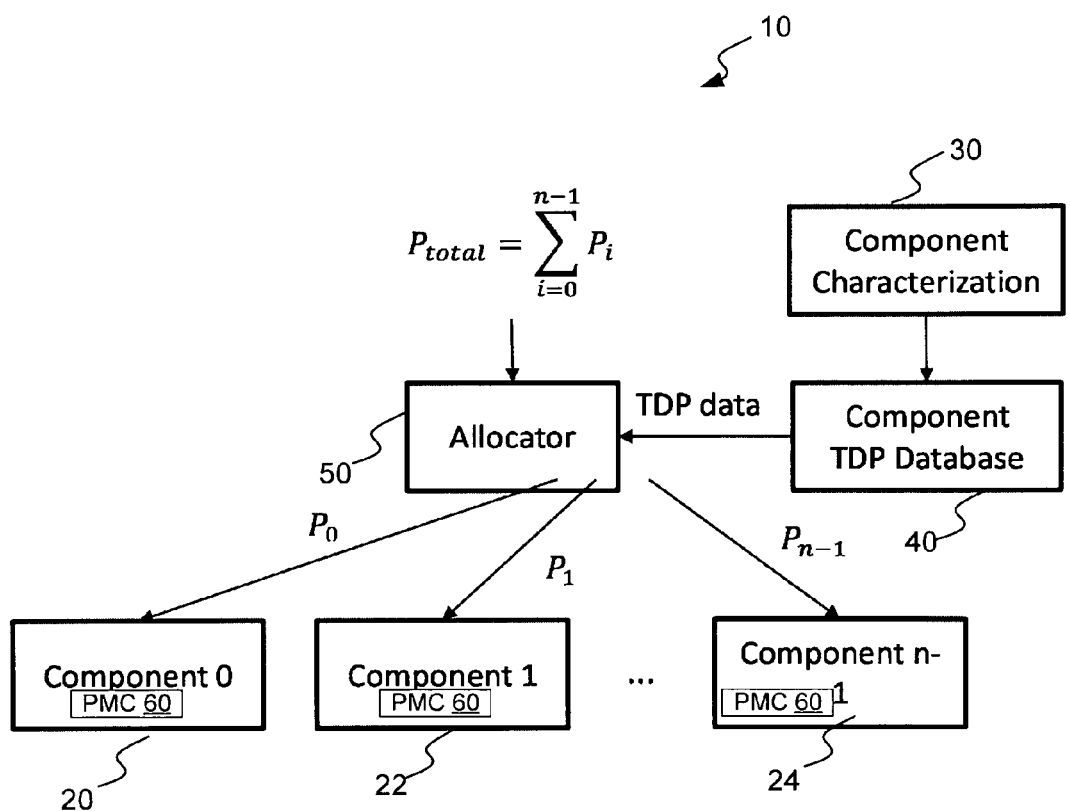
FIG. 1 is an illustration of an example of power allocation according to an embodiment.

Turning now to the drawings in detail, FIG. 1 depicts an apparatus 10 that allocates various powers $P_1$, $P_2$, and $P_{n-1}$ to components 20, 22, and 24 (e.g., processors) within a distributed computing system. While components 20, 22, and 24 may be processors, various other components may have power allocated to them according to the described embodiments. Other components include memory components, network interface components, chipsets, or any other component that draws power in apparatus 10. The expression "distributed computing system" may relate to a system with networked computers that communicate and coordinate their actions in order to achieve a common goal. In one example, a distributed computing system may utilize component groups to handle work according to various computational topologies and architectures. For example, an application may be divided into various tasks that may be subdivided into groups of related subtasks (e.g., threads), which may be run in parallel on a computational resource. Related threads may be processed in parallel with one another on different components as "parallel threads," and the completion of a given task may entail the completion of all of the related threads that form the task. Similar performance of each component reduces wait time for completion of related threads.

At the time a new workload such as an application is launched in the distributed computing system, power may be allocated to the various parallel components 20, 22, and 24. The components 20, 22, and 24 may be characterized by a component characterization module 30, which may include fixed-functionality logic hardware, configurable logic, logic instructions (e.g., software), etc., or any combination thereof. The characterization data may be obtained from a component database 40 employing, for example, software and/or hardware. For each of the components 20, 22, and 24, the database 40 may include a measurement of the component thermal design power. The thermal design power (TDP) may be the maximum power at which it is safe to operate the component before there is risk of damage. For example, the TDP might represent the maximum amount of power the cooling system is required to dissipate. The maximum amount of power may therefore be the power budget under which the system typically operates. The maximum amount of power may not be, however, the same as the maximum power that the component can consume. For example, it is possible for the component to consume more than the TDP power for a short period of time without it being "thermally significant". Using basic physics, heat will take some time to propagate, so a short burst may not necessarily violate TDP.

The illustrated power allocator 50 allocates power among the components 20, 22, and 24, then utilizes mechanisms provided by the system software, firmware, and/or hardware to enforce the power allocation. One example of a mechanism of enforcing a power allocation is a Power Monitoring and Control (PMC) module 60 that may be included with each of the components 20, 22, and 24. PMC may provide energy measurements or estimates through system software, firmware, or hardware, and it may enforce configurable limits on power consumption. PMC may report either a digital estimation of power, a measurement of power from sensors (external to the component 20, 22, 24 or internal), or some hybrid. In one embodiment, PMC reports measurements from sensors at voltage regulators and the voltage regulator and sensors are external to the component (e.g., located on a motherboard). However, PMC may report measurements from sensors at voltage regulators that may be a mixture of external and internal voltage regulators. In other aspects, PMC may report digital estimations of power from a model based on activity in different component resources with activity being measured through event counters. Note that any of the PMC techniques, whether power is reported as an estimate, a measurement from one or more sensors, or a hybrid are applicable for power allocation in the various embodiments set forth herein. RAPL (Running Average Power Limiting) is an example of a PMC technique that may be used in the embodiments.

The power allocator 50 may compute the best allocation of power among the components 20, 22, and 24 in various ways. In one embodiment, the power allocation of each component (denoted as $P_i$), may be computed by taking the ratio of that component's TDP measurement (TDP) to the sum of TDP for all components and scaling that ratio by a factor equal to the total power ($P_{total}$) for all components. $P_i$ may represent a proportional allocation of power based on TDP and assumes that component performance is proportional to power with constant of proportionality m=1; i.e., adding one unit of power to a component increases its performance by one unit:

$$P_i = P_{total} * \frac{TDP_i}{\sum_{k=0}^{n-1} TDP_k}$$

In another embodiment, a more general model of the relationship between the power and performance of a component may be employed. For example, linear relationships may be assumed, wherein the power allocation decision may be cast as a linear optimization problem and the best allocation may be obtained through linear programming. In another example, non-linear models may be assumed, and the best allocation may be obtained through a numerical solver.

In various embodiments, the power allocator 50 and component TDP database 40 may be implemented in different combinations of software, firmware, and hardware. For embodiments with a software implementation, the power allocator 50 and component TDP database 40 may be integrated into a system resource manager and/or scheduler or they may be separate components that provide software APIs to the system resource manager and/or scheduler enabling them to select a total power budget and query component TDP data. In embodiments with a firmware or hardware implementation, the system resource manager and/or scheduler may likewise be provided with interfaces to the hardware to specify a total power budget or query TDP data. Control registers or model specific registers may be used for the hardware interface.

In an alternative embodiment where the system or workload power may be reduced to a percentage of its maximum value rather than reduced to a specific absolute power, the power may be selected for each component differently: as before, the component's TDP is read from the database 40 but it is scaled by a factor equal to the factor that total power should be reduced to from maximum power (α):

$$P_i = \alpha * TDP_i$$

Figure 2:
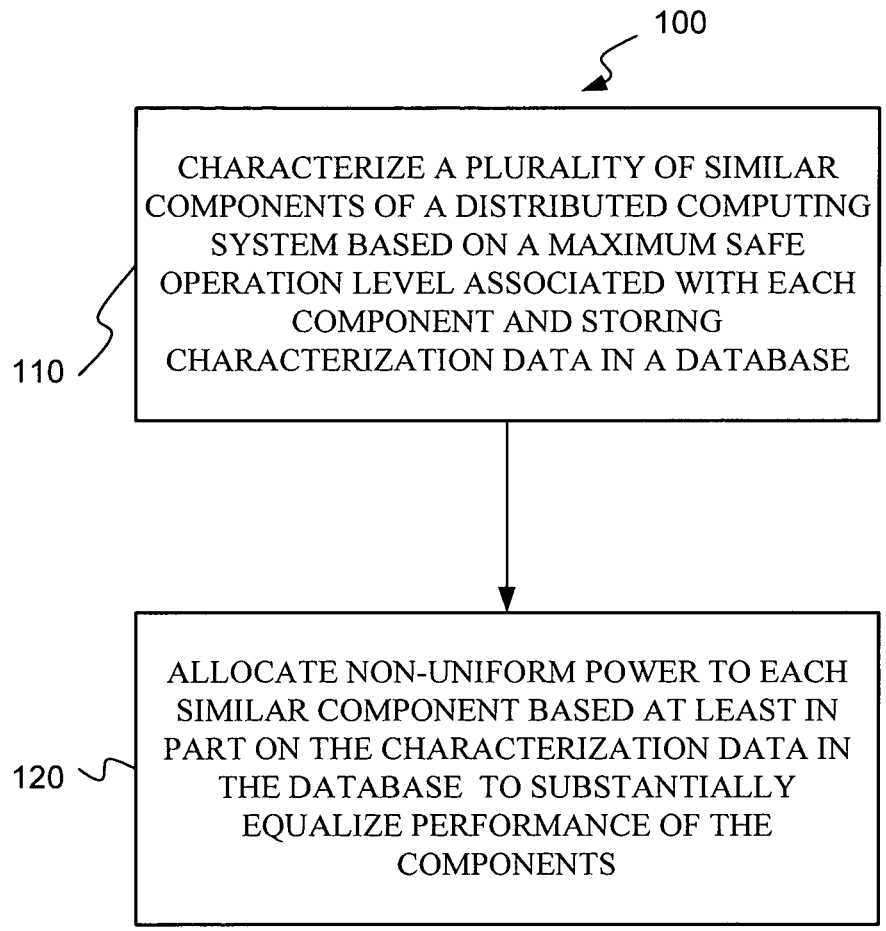
FIG. 2 is a flowchart of an example of a method of power allocation according to an embodiment.

FIG. 2 shows an overview of a method 100 of mitigating performance variation among components in a distributed computing system. The method 100 may generally be implemented in an apparatus such as, for example, the apparatus 10 (FIG. 1), already discussed. More particularly, the method 100 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 100 may be written in any combination of one or more programming languages, including an object oriented programming language such as JAVA, SMALL-TALK, C++ or the like and conventional procedural programming languages, such as the "C" programming language or similar programming languages.

Illustrated processing block 110 provides for characterizing a plurality of similar components of a distributed computing system based on a maximum safe operation power level associated with each component. The characterization data is stored in a database. With continuing reference to FIGS. 1 and 2, the components may be components 20, 22, and 24 that, in one embodiment, may be similar processors having manufacturing variations from processor to processor that affect power levels required by each processor for correct functioning. The database may be, for example, the component TDP database 40. The database 40 may update the maximum safe operation power level while the system is running or may draw on data established at the time of manufacture of the components.

Illustrated processing block 120 allocates non-uniform power to each similar component (e.g., components 20, 22, and 24 of FIG. 1) based at least in part on the characterization data in the database to substantially equalize performance of the components. As discussed above, nominally "identical" components may have different power needs to achieve a similar performance due to manufacturing variations. Thus, block 120 might allocate non-uniform power to components 20, 22, and 24 to ensure that the performance of the components 20, 22, and 24 will be substantially similar.

Figure 3:
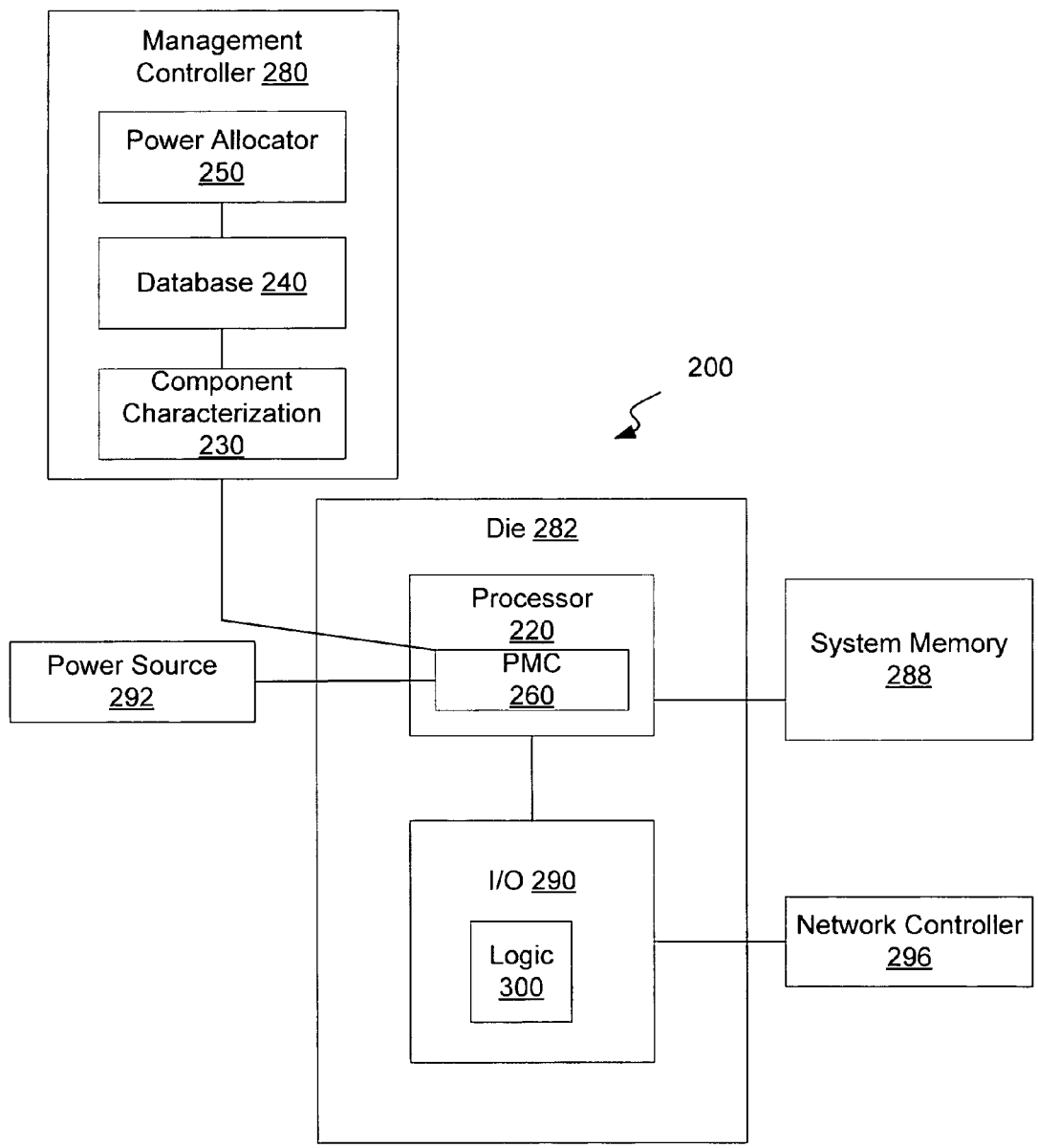
FIG. 3 is an illustration of an example of a computing system according to an embodiment.

FIG. 3 shows a computing system 200. The computing system may be part of an electronic device/platform having computing functionality and may also form part of a distributed computing system, as described above. In the illustrated example, the system 100 includes a power source 292 to provide power to the system. The power source 292 may provide power to plural computing systems 200 as part of a distributed computing system. The computing system 200 may include a die 282 that has a processor 220 with a PMC module 260. The processor 220 may communicate with system memory 288. The system memory 288 may include, for example, dynamic random access memory (DRAM) configured as one or more memory modules such as, for example, dual inline memory modules (DIMMs), small outline DIMMs (SODIMMs), etc.

The illustrated system 80 also includes an input output (I/O) module 290 implemented together with the processor 220 on semiconductor die 282 as a system on a chip (SoC), wherein the I/O module 290 functions as a host device and may communicate with peripheral devices such as a display (not shown), network controller 296 and mass storage (not shown) (e.g., hard disk drive HDD, optical disk, flash memory, etc.). The illustrated I/O module 290 may execute logic 300 that forms a part of the power allocation as set forth in FIG. 1.

Alternatively hardware and/or software logic that performs the power allocation of FIG. 1 may be found in a management controller 280 as seen in FIG. 3. The power allocator 250 communicates with the TDP database 240 that, in turn, communicates with component characterization element 230, in a manner substantially similar to that described for elements 50, 40, and 30 of FIG. 1. The hardware and/or software logic that performs the power allocation may reside elsewhere within a distributed computing network. For example, power allocator 250, database 240, and component characterization 230 may be implemented in software with the allocator running as a process on one or more of the processors (a distributed software runtime). Alternatively, the allocator may by implemented in firmware in the management controller on one or more of the motherboards (a distributed firmware solution). The allocator may be implemented in firmware in one or more of the processors (a distributed firmware solution). Moreover, the allocator may be implemented in hardware logic on one or more of the processors (a distributed hardware solution).

Additional Notes and Examples

Example 1 may include an apparatus to mitigate performance variation among components in a distributed computing system comprising a plurality of computational resources that are connected to one another to form the distributed computing system, logic, implemented at least partly in one or more of configurable logic or fixed-functionality logic hardware, to characterize a plurality of similar components of the distributed computing system based on a maximum safe operation level associated with each component and store characterization data in a database, and allocate non-uniform power to each similar component based at least in part on characterization data in the database to substantially equalize performance of the components.

Example 2 may include the apparatus of example 1, wherein the components are processors.

Example 3 may include the apparatus of examples 1 or 2, wherein the plurality of similar components are to be characterized while the distributed computing system is running.

Example 4 may include the apparatus of examples 1 or 2, further including running average power limiting firmware and hardware to enforce non-uniform power allocations.

Example 5 may include the apparatus of examples 1 or 2, further including logic to determine, for each component, a ratio of maximum safe operation power level to a sum of maximum safe operation power level for all components, and scale the ratio by a factor equal to total power for all components.

Example 6 may include the apparatus of examples 1 or 2, further including logic to scale maximum safe operation power level by a factor that total power is to be reduced from maximum power.

Example 7 may include a method of mitigating performance variation among components in a distributed computing system comprising characterizing a plurality of similar components of a distributed computing system based on a maximum safe operation level associated with each component and storing characterization data in a database and allocating non-uniform power to each similar component based at least in part on the characterization data in the database to substantially equalize performance of the components.

Example 8 may include the method of example 7, wherein processors are characterized.

Example 9 may include the method of examples 7 or 8, wherein the plurality of similar components are to be characterized while the distributed computing system is running.

Example 10 may include the method of examples 7 or 8 wherein the plurality of similar components are to be characterized at the time of manufacture of the components.

Example 11 may include the method of examples 7 or 8, further including running average power limiting firmware and hardware to enforce non-uniform power allocations.

Example 12 may include the method of examples 7 or 8, further including determining, for each component, a ratio of maximum safe operation power level to a sum of maximum safe operation power level for all components, and scaling the ratio by a factor equal to total power for all components.

Example 13 may include the method of examples 7 or 8, further including scaling maximum safe operation power level by a factor that total power is to be reduced from maximum power.

Example 14 may include at least one computer readable storage medium comprising a set of instructions, wherein the instructions, when executed, cause a computing device in a distributing computing system to characterize a plurality of similar components of the distributed computing system based on a maximum safe operation level associated with each component and storing characterization data in a database, and allocate non-uniform power to each similar component based at least in part on the characterization data in the database to substantially equalize performance of the components.

Example 15 may include the medium of example 14, wherein processors are to be characterized.

Example 16 may include the medium of examples 14 or 15, wherein the instructions, when executed, cause the computing device to characterize the components while the distributed computing system is running.

Example 17 may include the medium of examples 14 or 15, wherein the instructions, when executed, cause the computing device to allocate power through running average power limiting firmware and hardware.

Example 18 may include the medium of examples 14 or 15, wherein the instructions, when executed, cause the computing device to allocate power by determining, for each component, a ratio of maximum safe operation power level to a sum of maximum safe operation power level for all components, and scaling the ratio by a factor equal to total power for all components.

Example 19 may include the medium of examples 14 or 15, wherein the instructions, when executed, cause the computing device to allocate power by scaling maximum safe operation power level by a factor that total power is to be reduced from maximum power.

Example 20 may include an apparatus to mitigate performance variation among components in a distributed computing system comprising means for characterizing a plurality of similar components of a distributed computing system based on a maximum safe operation level associated with each component and storing characterization data in a database and means for allocating non-uniform power to each similar component based at least in part on the characterization data to substantially equalize performance of the components.

Example 21 may include the apparatus of example 20, wherein processors are to be characterized.

Example 22 may include the apparatus of examples 20 or 21, wherein the plurality of similar components are to be characterized while the distributed computing system is running.

Example 23 may include the apparatus of examples 20 or 21, further including running average power limiting firmware and hardware to enforce non-uniform power allocations.

Example 24 may include the apparatus of examples 20 or 21 further including means for determining, for each component, a ratio of maximum safe operation power level to a sum of maximum safe operation power level for all components, and scaling the ratio by a factor equal to total power for all components.

Example 25 may include the apparatus of examples 20 or 21 further comprising means to cause the computing device to allocate power by scaling maximum safe operation power level by a factor that total power is to be reduced from maximum power.

Given a distributed computing system with homogeneous components, the embodiments described above allocate non-uniform power to each component from a total budget. The embodiments may correct for manufacturing variation and the performance variation it induces across components by selecting the power allocation that equalizes performance of all components. The allocation decision may be based on detailed characterization of each component either at manufacturing time or while the system is running. The allocation decision may also be based on averages and characterization over a set of representative benchmarks or adapted based on characterization of individual workloads.

Advantageously, use of the apparatus and methods described above may mitigate performance variation due to manufacturing variation across components in a distributed computing system. By mitigating manufacturing variation, the embodiments may significantly improve performance determinism across workload runs in typical systems that employ resource managers or schedulers which allocate different nodes for the workload on each run. The embodiments may also significantly improve performance and efficiency of high performance computing workloads which tend to employ distributed computation that may be tightly synchronized across nodes through collective operations or other global synchronization events; use of the embodiments reduces wait times at the synchronization events which reduces power wasted while waiting and reduces overall time to solution.

The embodiments may provide several advantages over other approaches. They may mitigate rather than aggravate performance variation across components. They may provide a substantially less complex solution for mitigating performance variation (by allocating power in proportion to TDP to equalize performance differences deriving from TDP differences). They may also provide substantially higher performance when applied to mitigating processor performance differences because processor frequency is controlled through a different mechanism than through discrete voltage-frequency steps at which the component may operate. Processor frequency may be managed by power limiting features such as PMC. Power limiting features like PMC enable each processor to run at the maximum safe operating frequency for each individual workload rather than a worst-case power virus workload. PMC provides energy measurements or estimates through system software, firmware, or hardware that enforce configurable limits on power consumption.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The terms "coupled" and "communicating" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
a plurality of computational resources that are connected to one another to form a distributed computing system; and
logic, implemented at least partly in one or more of configurable logic or fixed-functionality logic hardware, to:
characterize each of a plurality of similar components of the distributed computing system based on a thermal design power (TDP) level that is a maximum safe operation level associated with each component and store characterization data based on said TDP levels in a database;

determine, for each component, a ratio of component TDP level to a sum of the TDP levels for all components;

determine a factor equal to total power available to all components; and allocate non-uniform power to each similar component equal to the factor multiplied by the ratio based at least in part on the characterization data in the database to substantially equalize performance of the components.

2. The apparatus of claim 1, wherein the components are processors.

3. The apparatus of claim 1, wherein the plurality of similar components are to be characterized while the distributed computing system is running.

4. The apparatus of claim 1, further including running average power limiting firmware and hardware to enforce non-uniform power allocations.

5. The apparatus of claim 1, further including logic to scale the TDP level for each component by a reducing scaling factor.

6. A method comprising:

characterizing each of a plurality of similar components of a distributed computing system based on a thermal design power (TDP) level that is a maximum safe operation level associated with each component and storing characterization data based on said TDP levels in a database;

determining, for each component, a ratio of the component's TDP level to a sum of TDP levels for all components;

determining a factor equal to total power available to all components; and allocating non-uniform power to each similar component equal to the factor multiplied by the ratio based at least in part on the characterization data in the database to substantially equalize performance of the components.

7. The method of claim 6, wherein processors are characterized.

8. The method of claim 6, wherein the plurality of similar components are to be characterized while the distributed computing system is running.

9. The method of claim 6, wherein the plurality of similar components are to be characterized at the time of manufacture of the components.

10. The method of claim 6, further including running average power limiting firmware and hardware to enforce non-uniform power allocations.

11. The method of claim 6, further including scaling the TDP levels for each component by a reducing scaling factor.

12. At least one non-transitory computer readable storage medium comprising a set of instructions, wherein the instructions, when executed, cause a computing device in a distributing computing system to:

characterize each of a plurality of similar components of the distributed computing system based on a thermal design power (TDP) level that is a maximum safe operation level associated with each component and storing characterization data based on said TDP levels in a database;

determine, for each component, a ratio of the component's TDP level to a sum of TDP levels for all components;

determine a factor equal to total power available to all components; and allocate non-uniform power to each similar component equal to the factor multiplied by the ratio based at least in part on the characterization data in the database to substantially equalize performance of the components.

13. The medium of claim 12, wherein processors are to be characterized.

14. The medium of claim 12, wherein the instructions, when executed, cause the computing device to characterize the components while the distributed computing system is running.

15. The medium of claim 12, wherein the instructions, when executed, cause the computing device to allocate power through running average power limiting firmware and hardware.

16. The medium of claim 12, wherein the instructions, when executed, cause the computing device to allocate power by scaling the TDP level for each component by a reducing scaling factor.

17. The medium of claim 12, wherein the instructions, when executed allocates non-uniform power through a non-linear model.

* * * * *